(12) United States Patent
Dada

(10) Patent No.: US 11,206,279 B2
(45) Date of Patent: Dec. 21, 2021

(54) SYSTEMS AND METHODS FOR DETECTING AND VALIDATING CYBER THREATS

(71) Applicant: Olawale Oluwadamilere Omotayo Dada, London (GB)

(72) Inventor: Olawale Oluwadamilere Omotayo Dada, London (GB)

(*) Notice: Subject to any disclaimer, the term of this patent is extended or adjusted under 35 U.S.C. 154(b) by 99 days.

(21) Appl. No.: 16/664,992

(22) Filed: Oct. 28, 2019

(65) Prior Publication Data

US 2020/0067963 A1 Feb. 27, 2020

(51) Int. Cl.
| | |
|---|---|
| *H04L 29/06* | (2006.01) |
| *G06N 20/10* | (2019.01) |
| *G06Q 20/36* | (2012.01) |

(52) U.S. Cl.
CPC ......... *H04L 63/1433* (2013.01); *G06N 20/10* (2019.01); *G06Q 20/367* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 2006/0004614 A1* | 1/2006 | Hutchinson | G06Q 10/10 705/7.27 |
| 2007/0169199 A1* | 7/2007 | Quinnell | G06F 21/577 726/25 |
| 2014/0283083 A1* | 9/2014 | Gula | H04L 63/1433 726/25 |
| 2015/0172307 A1* | 6/2015 | Borohovski | H04L 63/1408 726/25 |
| 2019/0172026 A1* | 6/2019 | Vessenes | H04L 9/3247 |
| 2020/0117807 A1* | 4/2020 | Nadgowda | G06F 8/65 |
| 2020/0394309 A1* | 12/2020 | Angelo | G06F 16/22 |

* cited by examiner

*Primary Examiner* — Kaveh Abrishamkar

(57) ABSTRACT

Embodiments of the present invention provides systems and methods for detecting and validating cyber threats. The systems and methods provide blockchain and Artificial Intelligence (AI) technologies based analytical tool for the intuitive, automated and seamless performance of security checks, thereby giving users an ability to cut through the cyber jargon and understand, remediate, and resolve cyber security issues. The use of blockchain and smart contract voting rights system greatly reduces the level of manual administration, costs, and time required to advertise a new cyber threat via the Uncloak platform. All subscribers to the Uncloak platform may receive the latest list of cyber threat vulnerabilities against their existing computing infrastructure, allowing them to identify where the potential threats lie and can then take the necessary remediation steps.

18 Claims, 5 Drawing Sheets

SYSTEMS AND METHODS FOR DETECTING AND VALIDATING CYBER THREATS

FIELD OF THE INVENTION

The present application generally relates to cyber security, and particularly to systems and methods for detecting and validating cyber threats. More particularly, the present invention discloses a unique and fully scalable blockchain and Artificial Intelligence (AI) powered technologies that enable businesses to monitor, protect themselves against and eliminate cyber threats, staying one step ahead of hackers.

BACKGROUND

Computer hacking is identifying weakness in computer systems or networks to exploit its weaknesses to gain access. Now-a-days, computers have become mandatory to run successful businesses. It is not enough to have isolated computers systems, in fact, they need to be networked to facilitate communication with external businesses. This exposes them to the outside world and hacking. Computer hacking means using computers to commit fraudulent acts such as fraud, privacy invasion, stealing corporate or personal data, and so on. Computer hacking is one of the world's major problems with new breaches of data and releases of ransomware occurring at an alarming rate. Cyber-crimes cost many organizations millions of dollars every year. For example, with the recent trends, cyber-crimes are predicted to cost $6 trillion annually by 2021. There are no boundaries: from some of the world's largest corporations, to critical national infrastructure, to small local enterprises and individuals. They have been hacked in the past and trends suggest this will continue, particularly as evolving programs such as Internet of Things (IoT), smart cities, and mass digitization become the reality of life.

Cyber security attacks are more frequent than ever before, partly due to the availability of internet connectivity across all types of devices from laptops, desktops, notepads, and mobile phones affecting not just businesses but individuals as well. Crypto currencies, crypto exchanges, and tokens issuance platforms have also suffered from significant security breaches over the last few years further compounding the issue.

The public sector, internet, and telecommunications sectors are highly susceptible to espionage focused cyber-attacks. Businesses need to be aware of the full costs of a cyber-attack, in particular, the "slow-burn" costs i.e., those associated with the long-term impacts of a cyber-attack, such as the loss of competitive advantage and customer churn. When added to immediate costs i.e., legal and forensic investigation fees, and extortion pay outs, slow burn costs can dramatically increase the final bill.

Security breaches can cause serious financial and reputational damage. There is no standard model for estimating incident cost, the only data available is that made public by organizations involved. Computer security consulting firms have produced estimates of total worldwide losses: from $13 billion (worms and viruses only) to $226 billion (for all forms of covert attacks) annually. This has forced companies to diversify products, moving from "detect only" to "detect and respond", tracking data leaks, hacks, other intrusions and preventing further repercussions from stolen data. For businesses, this mean stopping access to accounts and services subject to data loss or infiltration, tracking the source of intrusion, and shoring up cyber defenses. Unfortunately, most companies are highly exposed to cyber threats due to the constantly changing nature of cyber-attacks which require security expertise and financial resource to remain secure.

Currently, there is a shortage of cyber security solutions that are proactive in identifying new threats and allowing end users to shut them out or close them down. Whilst some capabilities exist at a Governmental level, the present invention discloses a tool that will close this gap and maintain significant revenues across the many sectors that are susceptible to cyber-crimes.

Tackling cyber security threats requires more than anti-virus protection, firewalls, and intrusion detection systems. Currently, cyber security solutions rely on an isolated and custom-made approach to cyber threat management with limited knowledge sharing between competitive security vendors. Most of the patterns and signatures that aid cyber security software in detecting a security vulnerability are freely available on the public internet, thus allowing the hacker to have the same knowledge as a security vendor. The result is an endless game of cat and mouse, with a cyclical race to stay one step ahead, until the next breach is surfaced. The status-quo puts the advantage with the hacker.

In the light of above-mentioned background, there exists a need for a solution that solves the abovementioned problems and provides a seamless mechanism for monitoring, protecting themselves against and eliminating cyber threats, thereby staying one step ahead of hackers. In order to solve the abovementioned problems and provides the seamless mechanism, the present invention discloses a unique and fully scalable blockchain and Artificial Intelligence (AI) technologies based analytical tool for intuitive, automated, and seamless performance of security checks, thereby giving users the ability to cut through the cyber jargon and understand, remediate, and resolve cyber security issues. In the absence of innovation tools of the present invention as described below in detail, successfully evaluating a company's computers and network infrastructure requires specialized, highly skilled labor, extensive setup time and significant costs. The present invention, by virtue of its implementation, seeks to make this level of cyber security available on a mass scale, at a lower cost and with simple end user interaction.

SUMMARY

It will be understood that this disclosure in not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only and is not intended to limit the scope of the present disclosure.

It is an objective of the present invention to provide a unique and fully scalable blockchain powered technology that enables businesses to monitor, protect themselves against and eliminate cyber threats, staying one step ahead of the hacker.

It is another objective of the present invention to provide an Artificial Intelligence (AI) based analytical tool for the intuitive, automated and seamless performance of security checks, thereby giving users an ability to cut through the cyber jargon and understand, remediate, and resolve cyber security issues.

It is another objective of the present invention to create a decentralized, scalable, blockchain powered cyber security management solution that places an emphasis upon the strength of the wider community to contribute to finding vulnerabilities through a blockchain based mechanism.

In an embodiment, the present invention facilitates using a number of smart contracts. A smart contract is a function allowing a set of predetermined actions to be performed in a secure manner. For example, a smart contract may allow tokens to be issued to a hacker on the basis that a new cyber threat vulnerability has been found and checked by other hackers in the same community. Using a token (called as UCC token) on a cyber security platform (such as Uncloak platform), a smart contract may be used to create a voting rights system that allows a community of registered IT security experts or software developers (known as 'hunters') to collaborate on finding cyber threats or security issues within one or more applications and network devices of an organization, while also finding a remediation needed to resolve the cyber threat issues. In an embodiment, any vulnerabilities that have been found within an application by a hunter (i.e., an ethical or non-ethical hacker) are immediately checked against an existing public cyber vulnerability database. The check is performed to ensure that it is indeed a new cyber threat and not an existing recorded threat. Each hunter has ability to check another hunter's vulnerability, taking one or more validators (i.e., ethical or non-ethical hackers) to check if the vulnerability found is genuine and may be recorded to the blockchain as a real cyber threat. In an embodiment, the hunter discovering the vulnerability (i.e., the new cyber threat) may be rewarded with one or more tokens (for example, may be given 10,000 UCC tokens) unique to the platform, whilst the hunters (i.e., the one or more validators) who have checked the validity of the vulnerability may be rewarded with one or more tokens (for example, may be given 1500 UCC tokens each). The one or more tokens may be converted on the Uncloak platform to tradeable UNC tokens which can be exchanged for other digital currency such as Ethereum on a public exchange.

In an embodiment, the use of the blockchain and smart contract voting rights system greatly reduces the level of manual administration, costs, and time required to advertise a new cyber threat via the Uncloak platform. All subscribers to the Uncloak platform may receive the latest list of cyber threat vulnerabilities against their existing computing infrastructure, allowing them to identify where the potential threats lie and can then take the necessary remediation steps.

These and other features and advantages of the present invention will become apparent from the detailed description below, in light of the accompanying drawings.

BRIEF DESCRIPTION OF ACCOMPANYING DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of various examples. It is expressly understood, however, that the drawings are for the purpose of illustration and description only and are not intended as a definition of the limits of the invention. Embodiments of this invention will now be described by way of example in association with the accompanying drawings in which:

Figure 4:
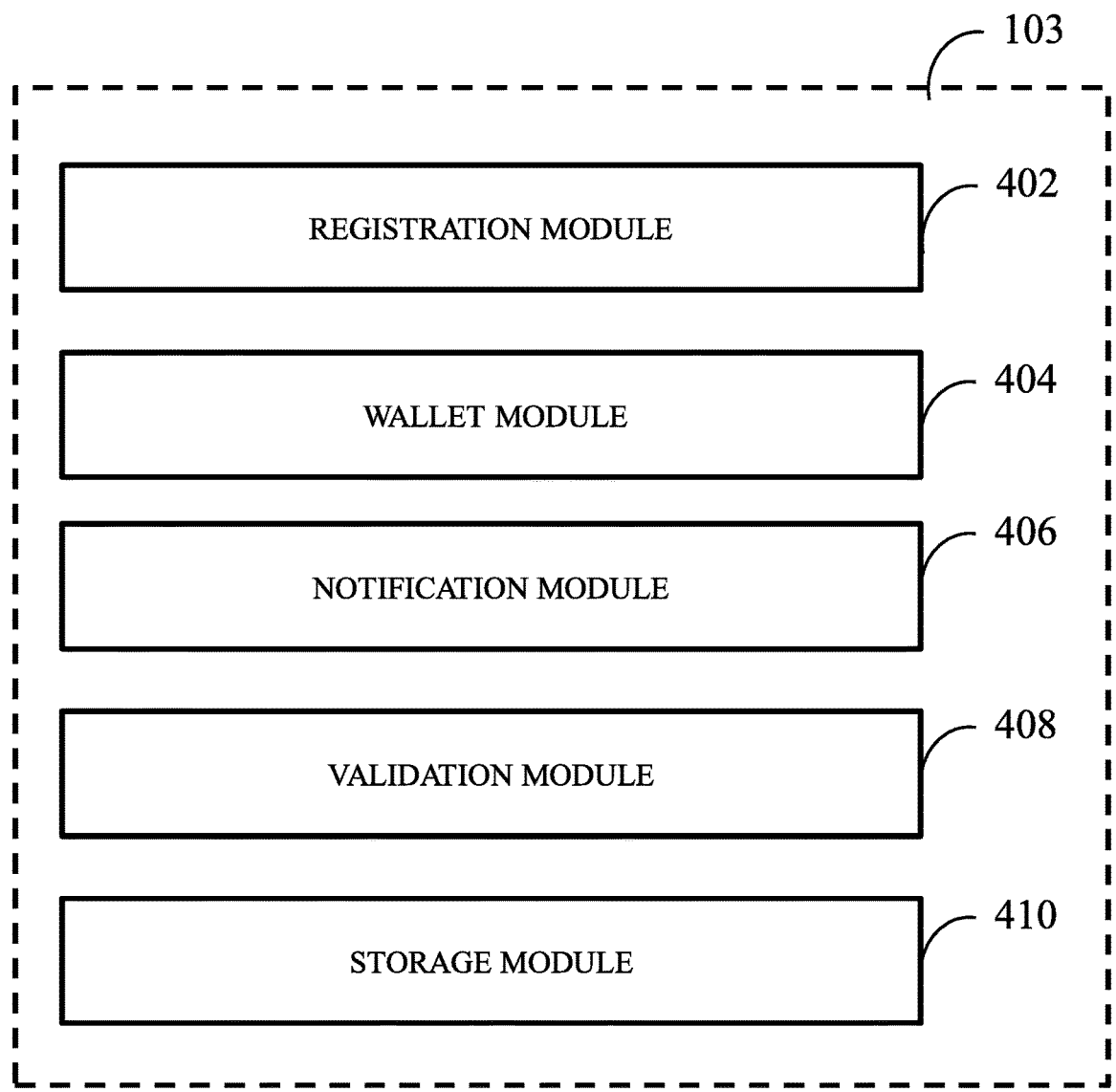
Figure 5:
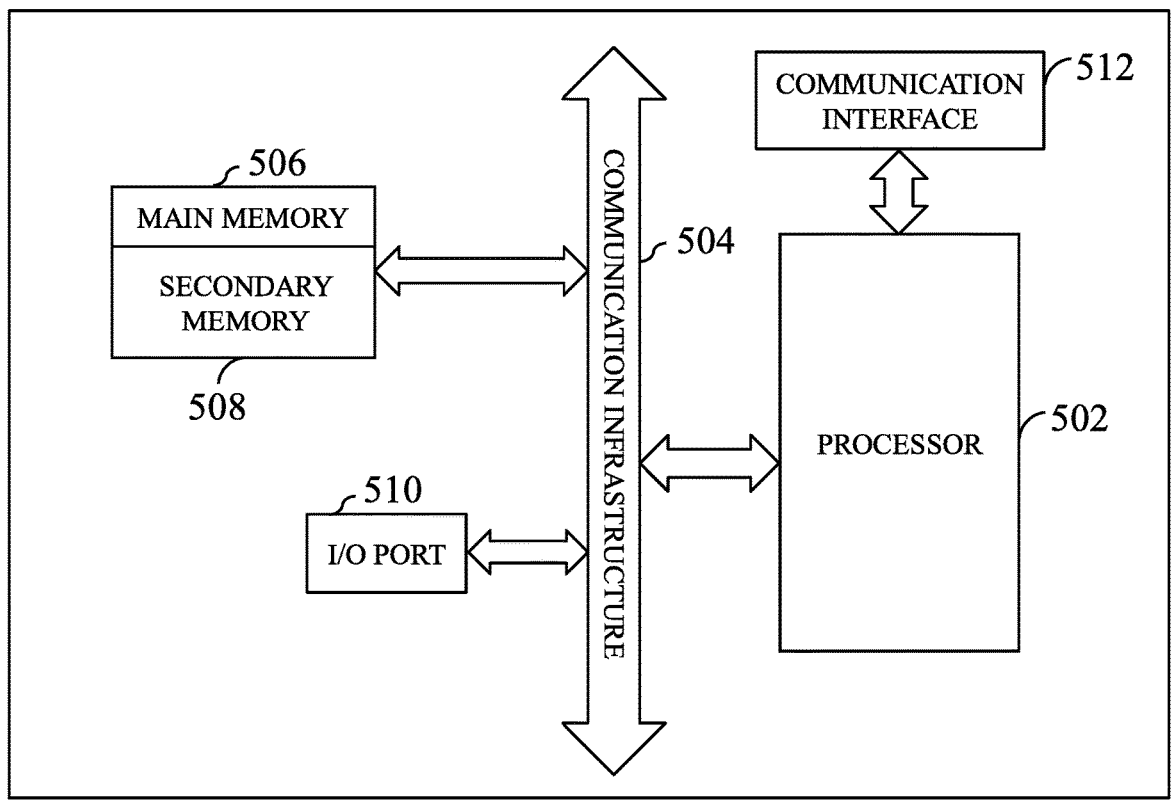

FIG. 4 is a diagram that illustrates a representative block diagram of the Uncloak platform, according to an exemplary embodiment of the present invention; and FIG. 5 is a diagram that illustrates a system architecture of a computer system for detecting and validating cyber threats by using various features facilitated by the Uncloak platform in an online manner, according to an exemplary embodiment of the present invention.

Further areas of applicability of the present invention will become apparent from the detailed description provided hereinafter. It should be further understood that the detailed description of exemplary embodiments is intended for illustration purposes only and is, therefore, not intended to necessarily limit the scope of the invention.

DETAILED DESCRIPTION

As used in the specification and claims, the singular forms "a", "an" and "the" may also include plural references. For example, the term "an article" may include a plurality of articles. Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present invention. There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of components, which constitutes systems and methods for detecting cyber threats by one or more hunters and validating the detected cyber threats by one or more validators by using various features facilitated by the Uncloak platform in an online manner. Accordingly, the components have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the present invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the present invention.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

The words "comprising", "having", "containing", and "including", and other forms thereof, are intended to be equivalent in meaning and be open ended in that an item or items following any one of these words is not meant to be an exhaustive listing of such item or items or meant to be limited to only the listed item or items.

Techniques consistent with the present invention provide, among other features, systems and methods for detecting cyber threats by one or more hunters and validating the detected cyber threats by one or more validators. More particularly, the present invention discloses a unique and fully scalable blockchain and Artificial Intelligence (AI) powered technologies that enable businesses to monitor, protect themselves against and eliminate cyber threats, staying one step ahead of hackers. The use of the blockchain and AI powered technologies and smart contract voting rights system greatly reduces the level of manual administration, costs and time required to advertise a new cyber threat via the Uncloak platform. All subscribers to the Uncloak platform may receive the latest list of cyber threat vulnerabilities against their existing computing infrastructure, allowing them to identify where the potential threats lie and can then take the necessary remediation steps.

Unless stated otherwise, terms such as "first" and "second" are used to arbitrarily distinguish between the elements or entities. Thus, these terms are not necessarily intended to indicate temporal or other prioritization of such elements or priorities. While various exemplary embodiments of the disclosed systems and methods have been described below, it should be understood that they have been presented for purposes of example only, and not limitations. It is not exhaustive and does not limit the present invention to the precise form disclosed. Modifications and variations are possible in light of the below teachings or may be acquired from practicing of the present invention, without departing from the breadth or scope.

Various methods and systems of the present invention will now be described with reference to the accompanying drawings, which should be regarded as merely illustrative without restricting the scope and ambit of the present invention. The present invention provides systems and methods for detecting cyber threats by one or more hunters and validating the detected cyber threats by one or more validators. Embodiments of the present invention will now be described with reference to FIGS. 1-5.

Figure 1:
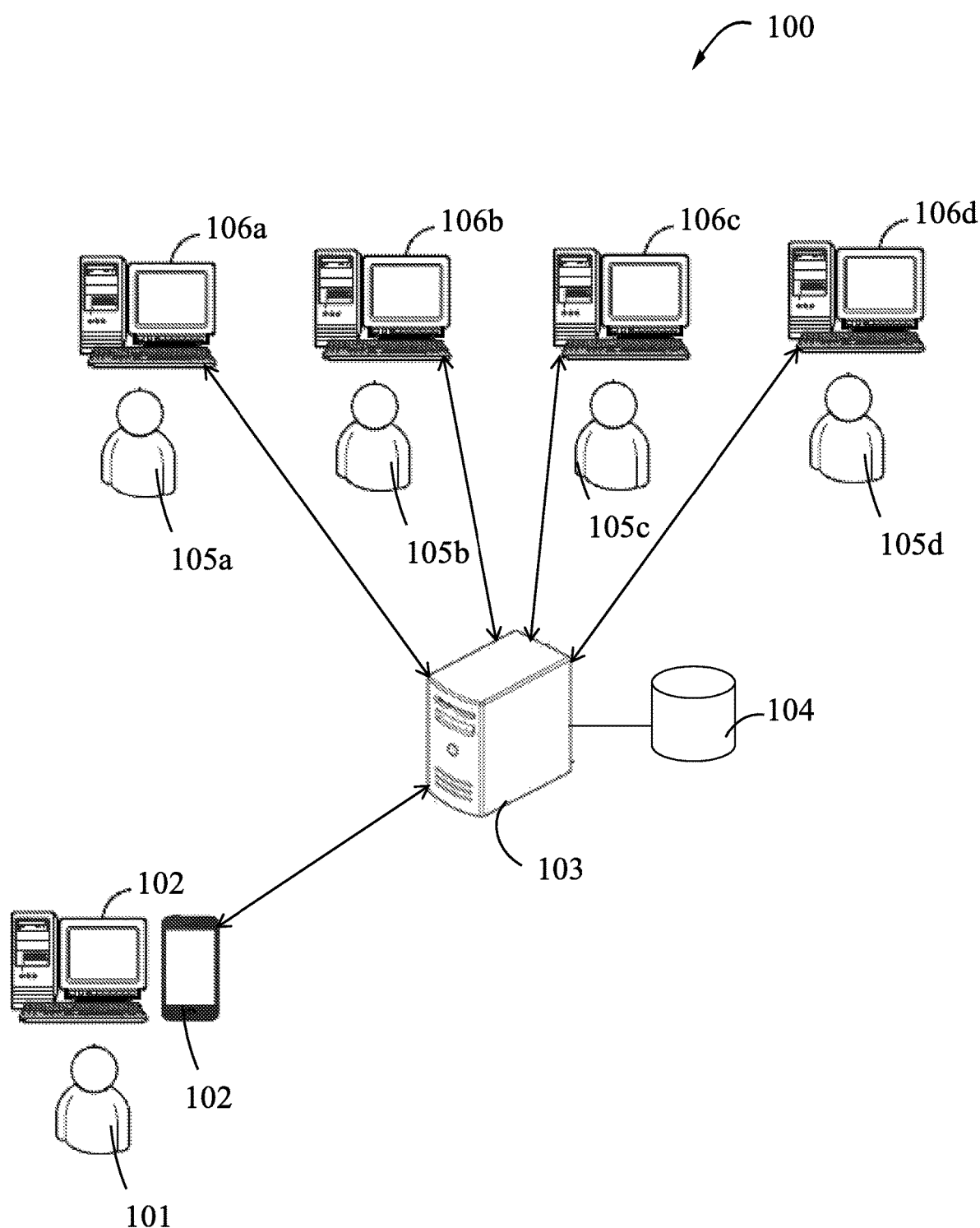
FIG. 1 is a diagram that illustrates a system environment for detecting and validating cyber threats, according to an exemplary embodiment of the present invention.

FIG. 1 is a diagram that illustrates a system environment 100 for detecting and validating cyber threats, according to an exemplary embodiment of the present invention. The system environment 100 includes a customer 101, a computing infrastructure 102 associated with the customer 101, and an Uncloak platform 103 with one or more databases 104 for information storage. The system environment 100 further includes a community of registered IT security experts or software developers (known as 'hunters') such as a first hunter 105a, a second hunter 105b, a third hunter 105c, and a fourth hunter 105d. Each hunter is associated with a computing device, for example, the first hunter 105a is associated with a first computing device 106a, the second hunter 105b is associated with a second computing device 106b, the third hunter 105c is associated with a third computing device 106c, and the fourth hunter 105d is associated with a fourth computing device 106d. Various electronic infrastructure (such as the computing infrastructure 102, the Uncloak platform 103, the database 104, the first computing device 106a, the second computing device 106b, the third computing device 106c, the fourth computing device 106d, and so on) of the system environment 100 may communicate with each other over one or more communication networks. Examples of types of a communication network include, but are not limited to, a local area network, a wide area network, a radio network, a virtual private network, an internet area network, a metropolitan area network, a satellite network, a Wi-Fi network, Bluetooth Low energy, a wireless network, and a telecommunication network. Examples of the telecommunication network include, but are not be limited to, a global system for mobile communication (GSM) network, a general packet radio service (GPRS) network, third Generation Partnership Project (3GPP), 4G, 5G, Long-Term Evolution (LTE), an enhanced data GSM environment (EDGE) and a Universal Mobile Telecommunications System (UMTS).

In an embodiment, the customer 101 may be an individual associated with an entity such as a company or a business that is engaged in providing one or more products or services to other customers. For example, the customer 101 may be associated with the entity who are involved with Business-to-business (B2B), Business-to-Consumer (B2C), Business-to-government (B2G), Consumer-to-consumer (C2C), Government to consumer (G2C), or Government-to-business (G2B). Various services in a diversity of industrial fields may include financial services such as a wire transfer or stock trading by accessing servers operated by banks or securities firms, civil services such as issuing copies of resident registration and other various certificates by accessing servers operated by governmental bodies, and e-commerce services for purchasing goods by accessing servers for selling goods. In an embodiment, the customer 101 may be associated with the computing infrastructure 102. The computing infrastructure 102 may include one or more electronic devices that can be used to communicate with other devices or servers over the one or more communication networks. Examples of the computing infrastructure 102 include, but are not limited to, a cell phone, a smart phone, a cellular phone, a cellular mobile phone, a personal digital assistant (PDA), a navigation terminal, a personal computer, a laptop, a tablet computer, or a network of computers. The customer 101 may utilize the computing infrastructure 102 to perform one or more tasks associated with the company or business. In some embodiments, the computing infrastructure 102 may be configured to automatically perform the one or more tasks by executing and processing suitable logic, circuitry, interfaces, instructions, and/or code. The computing infrastructure 102 may be communicatively connected over the private or public Internet.

In an embodiment, the Uncloak platform 103 may be an application server and may include suitable logic, circuitry, interfaces, and/or code, executable by the circuitry, that may be configured to perform one or more operations. The Uncloak platform 103 may be a computing device or application, which may include a software framework, that may be configured to create the server implementation and perform the various operations. The Uncloak platform 103 may be realized through various web-based technologies, such as, but are not limited to, a Java web-framework, a .NET framework, a professional hypertext preprocessor (PHP)

framework, a python framework, or any other web-application framework. The Uncloak platform 103 may also be realized as a machine-learning model that implements any suitable machine-learning techniques, statistical techniques, or probabilistic techniques. Examples of such techniques may include expert systems, fuzzy logic, support vector machines (SVM), Hidden Markov models (HMMs), greedy search algorithms, rule-based systems, Bayesian models (e.g., Bayesian networks), neural networks, decision tree learning methods, other non-linear training techniques, data fusion, utility-based analytical systems, or the like. The Uncloak platform 103 may also be realized and implemented using blockchain and AI based technologies. Examples of the Uncloak platform 103 may include, but are not limited to, a personal computer, a laptop, or a network of computer systems.

In an embodiment, the present invention, by way of at least one of the Uncloak platform 103, the database 104, and one or more hunter computing devices (such as the first computing device 106a, the second computing device 106b, the third computing device 106c, the fourth computing device 106d) describes technologies for detecting and managing one or more cybersecurity vulnerabilities. These technologies generally involve managing cybersecurity vulnerabilities based on a blockchain network and/or AI powered technologies. In some embodiments, parties involved in a security vulnerability management of a service providing platform, such as one or more of a service provider, a service user, an administrator or regulator, or a hunter (i.e., a security specialist) can be integrated by a blockchain network. Each of these parties can be a participant (such as the first hunter 105a, the second hunter 105b, the third hunter 105c, or the fourth hunter 105d) or a client (such as the customer 101) of the blockchain network. Each party can process information related to the cybersecurity vulnerabilities by interacting with the blockchain network, for example, via a smart contract. The blockchain-based cybersecurity vulnerability management platform (such as the Uncloak platform 103) can provide defined interfaces and easy access to the parties and provide enhanced data security of the service providing platform. As described herein, a cybersecurity vulnerability can be a weakness (in software, hardware, and/or network) that can be exploited by a cyber-attacker to perform unauthorized actions within a computer system or network. In some embodiments, a security specialist, such as an ethical or non-ethical computer hacker (also known as "hunter") can perform tests on one or more computer systems and networks to assess computer security and identify cybersecurity vulnerabilities. Resolutions (e.g., a software patch, an upgraded firewall, etc.) can be provided to remedy the identified cybersecurity vulnerabilities, so as to improve security by exposing vulnerabilities before malicious hackers can detect and exploit them.

In an embodiment, the database 104 may include suitable logic, circuitry, interfaces, and/or code, executable by the circuitry, that may be configured to perform one or more operations, such as receiving, storing, processing, and transmitting queries, data, or content. The database 104 may be a data management and storage computing device that is communicatively coupled to the Uncloak platform 103 via the one or more communication networks to perform the one or more operations. In an exemplary embodiment, the database 104 may be configured to manage and store various types of cyber security threats and their remedies, and thus the database 104 may be, hereinafter, referred to as a threat detection database 104 without limiting the scope of the present invention. The threat detection database 104 may be configured to use the AI technology to crawl the public and private Internet looking for the latest cyber security threats, which are converted into security signatures and added to the Uncloak threat detection system to check if one or more vulnerabilities (i.e., cyber security threats) exist across the subscribed client base networks and infrastructure (such as the computing infrastructure 102). In some embodiment, the Uncloak platform 103 may build the threat detection database 104. In an embodiment, the database 104 may be configured to receive one or more queries from the Uncloak platform 103 or various hunter computing devices (such as the first computing device 106a, the second computing device 106b, the third computing device 106c, the fourth computing device 106d). Each query may correspond to an encrypted message that is decoded by the database 104 to determine a request for retrieving requisite information requested by the Uncloak platform 103 or various hunter computing devices. In response to each received query, the database 104 may be configured to retrieve and communicate the requested information to the Uncloak platform 103 or various hunter computing devices. Examples of the database 104 may include, but are not limited to, a personal computer, a laptop, or a network of computer systems.

In an embodiment, the hunter (such as the first hunter 105a, the second hunter 105b, the third hunter 105c, or the fourth hunter 105d) may be a registered IT security experts or a software developer who is involved in finding cyber threats or security issues within one or more applications or network devices of an organization, while also finding one or more remediations or resolutions needed to resolve the cyber threat issues. Each hunter may utilize a respective computing device to detect or identify the cyber threats or security issues within the one or more applications or network devices of the organization. In an embodiment, the one or more vulnerabilities that may have been detected within an application or a network by the hunter (such as the first hunter 105a) are immediately checked against an existing public cyber vulnerability database such as the threat detection database 104. The check is performed to determine whether the detected vulnerability is a new cyber threat or an existing cyber threat. Further, in an embodiment, each hunter has ability to check another hunter's vulnerability, taking one or more validators to check if the detected vulnerability is genuine and may be recorded to the blockchain as a real cyber threat. For example, other hunters (such as the second hunter 105b, the third hunter 105c, and/or the fourth hunter 105d) may validate the one or more vulnerabilities detected by the first hunter 105a. In a scenario where the one or more detected vulnerabilities are determined as new security threats, then the first hunter 105a may be rewarded with one or more tokens (for example, may be given 10,000 UCC tokens) that are unique to the platform, while the other hunters (i.e., the one or more validators) who have checked the validity of the one or more vulnerabilities may be rewarded with one or more tokens (for example, may be given 1500 UCC tokens each). In an exemplary embodiment, the UCC tokens awarded to the first hunter 105a may be greater than the UCC tokens that are awarded to the other hunters who have validated the one or more vulnerabilities detected by the first hunter 105a. The one or more awarded tokens may be converted on the Uncloak platform 103 to tradeable UNC tokens which can be exchanged for other digital currency such as Ethereum on a public exchange.

Figure 2:
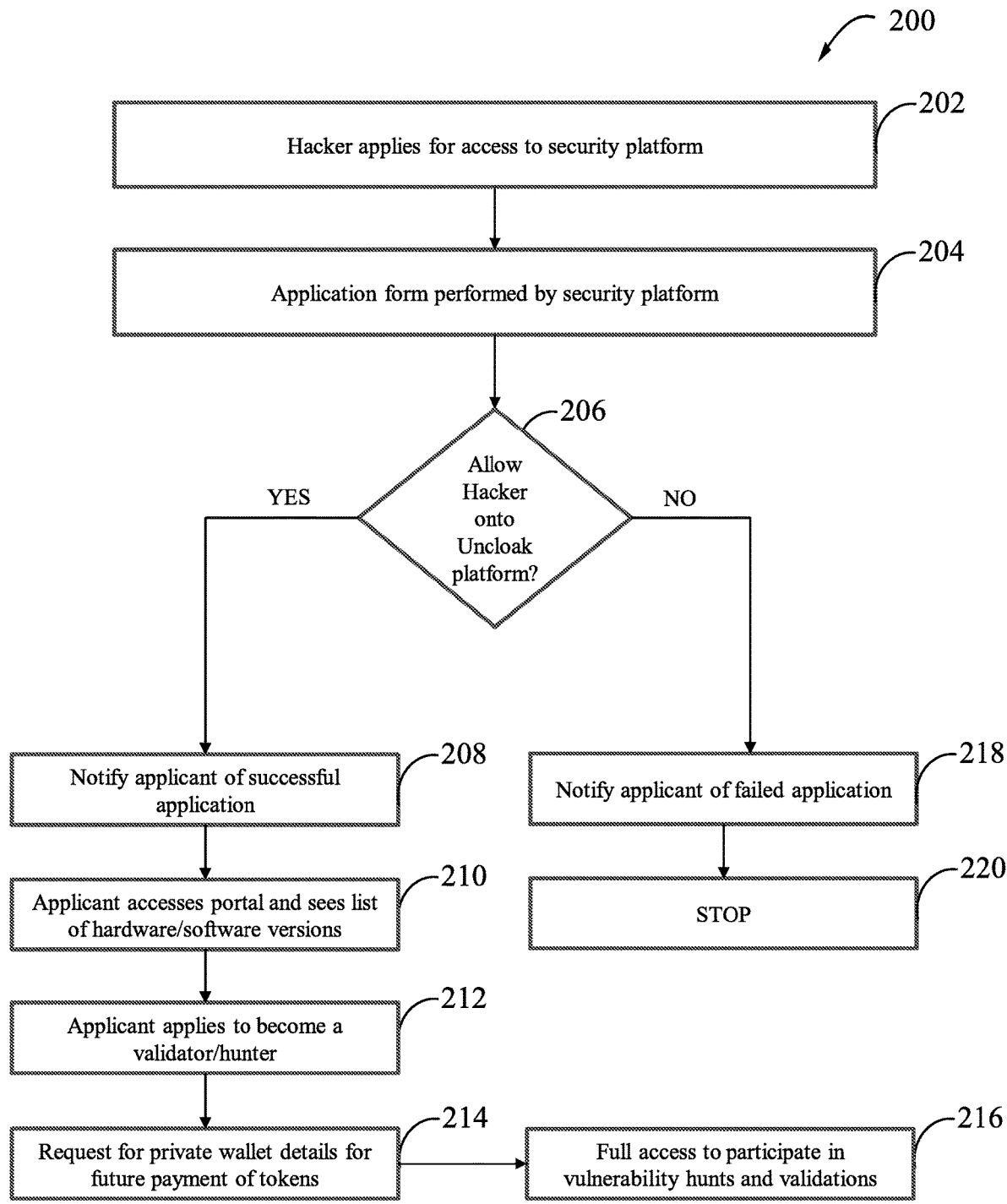
FIG. 2 is a diagram that illustrates a method for allowing hackers to become hunters or validators on Uncloak platform, according to an exemplary embodiment of the present invention.

FIG. 2 is a diagram 200 that illustrates a method for allowing hackers to become hunters or validators on the Uncloak platform 103, according to an exemplary embodiment of the present invention.

At step 202, one or more hackers (such as the first hunter 105a, the second hunter 105b, the third hunter 105c, and the fourth hunter 105d) apply for access to a security platform such as the Uncloak platform 103. Each of the one or more hackers may be an ethical hacker or a non-ethical hacker. In an embodiment, each hacker such as the first hunter 105a, the second hunter 105b, the third hunter 105c, and the fourth hunter 105d may utilize a respective computing device such as the first computing device 106a, the second computing device 106b, the third computing device 106c, the fourth computing device 106d, respectively, to apply for access to the security platform such as the Uncloak platform 103. In some embodiment, the Uncloak platform 103 may generate and present a registration interface to each hunter who wants to apply for access to the security platform such as the Uncloak platform 103. The hunters may utilize the registration interface to submit their interest for such access.

At step 204, application form analysis and processing are performed by the security platform such as the Uncloak platform 103. The Uncloak platform 103 may request each interested hunter to fill the requisite details in an application form and submit the duly filled application form. After receiving the duly filled application, the Uncloak platform 103 may validate the details of each interested hunter. The Uncloak platform 103 may generate a validation response based on an outcome of the validation of the details of each interested hunter. The validation response may indicate successful or unsuccessful validation. The outcome of the validation corresponds to the successful validation when the Uncloak platform 103 successfully validates the details of an interested hunter i.e., there is no discrepancy in the details of the interested hunter and meets one or more professional and experience level requirements. The outcome of the validation corresponds to the unsuccessful validation when the details of an interested hunter are not successfully validated i.e., there is some discrepancy in the details of the interested hunter and/or does not meet one or more professional and experience level requirements.

At step 206, a check is performed to determine whether the hacker (i.e., the interested hunter) is allowed onto the Uncloak platform 103 or not. In an embodiment, the Uncloak platform 103 may perform the check based on the validation response of the above validation. If at step 206, it is determined that the validation is successful, then step 208 is processed. However, if at step 206, it is determined that the validation is unsuccessful, then step 218 is processed.

At step 208, the applicant (i.e., the interested hunter who has previously applied and has been successfully validated) is notified of the successful application. In an embodiment, the Uncloak platform 103 may be configured to generate and communicate a notification message to the applicant. The notification message may indicate the successful application and onboarding of the applicant onto the Uncloak platform 103.

At step 210, the applicant accesses the portal (i.e., the Uncloak platform 103) and sees a list of hardware or software versions, a list of networks, a list of computing infrastructures, or the like. Upon successful registration, all registered applicants (i.e., registered ethical or non-ethical hackers) may be allowed to perform cybersecurity threat hunting onto the Uncloak platform 103. At step 212, the applicant applies to become a validator, a hunter, or both. Based on the credibility of the applicant, the Uncloak platform 103 may allow the applicant to become at least one of the validator or the hunter. The credibility of the applicant may be determined based on at least one of educational details, professional details, experience details, a success ratio, or the like. The success ratio may be a ratio of a total number of successful detection or validation of the one or more vulnerabilities to a total number of attempts to detect or validate the one or more vulnerabilities.

At step 214, the applicant requests for a private wallet details for future payment of tokens. For example, the applicant may request for a private Ethereum wallet for receiving the future payment. In an embodiment, the Uncloak platform 103 may generate the private wallet details for the applicant based on the initiated request and assign the generated private wallet details to the applicant for the future payment. At step 216, the applicant may obtain full access to participate in vulnerability hunts and validations. In an embodiment, the Uncloak platform 103 may be configured to provide the full access to the applicant to participate in the vulnerability hunts and validations.

At step 218, the applicant is notified of the failed application when it is determined that the validation is unsuccessful. In an embodiment, the Uncloak platform 103 may be configured to generate the notification message indicating the unsuccessful validation and hence the failed application and communicate the same to the applicant when it is determined that the validation is unsuccessful. At step 220, the process stops.

The various actions, acts, blocks, steps, or the like in the flow diagram 200 may be performed in the order presented, in a different order, or simultaneously. Further, in some embodiments, some of the actions, acts, blocks, steps, or the like may be omitted, added, modified, skipped, or the like without departing from the scope of the present invention.

The above process allows the necessary checks to be made before an applicant coming from an ethical hacking/penetration testing environment can access the Uncloak platform 103. The applicants then select which software or hardware version they believe has an unknown vulnerability with which to post to the Uncloak platform 103. This process involves two main outcomes: the applicants either receive their UCC tokens into their secure Wallets held on the block chain, or a message recorded on the Uncloak platform 103 is relayed to the applicant to state that the vulnerability is already known therefore payment will not be made.

Figure 3:
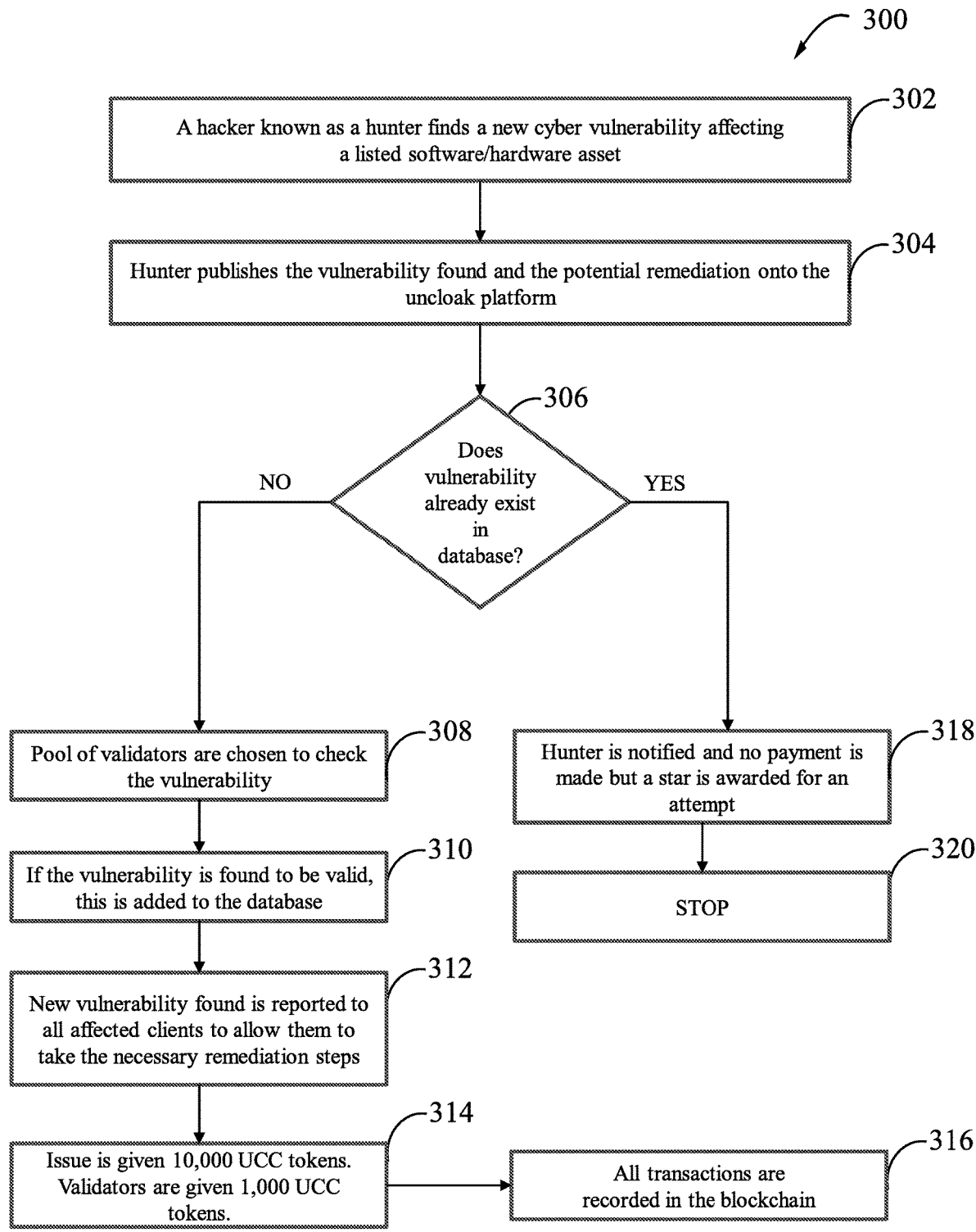
FIG. 3 is a diagram that illustrates a method for facilitating a voting rights mechanism in the Uncloak platform, according to an exemplary embodiment of the present invention.

FIG. 3 is a diagram 300 that illustrates a method for facilitating a voting rights mechanism in the Uncloak platform 103, according to an exemplary embodiment of the present invention.

At step 302, a hacker known as a hunter (such as the first hunter 105a) detects or finds a new cyber vulnerability affecting a listed software/hardware asset in a database such as the database 104 or the subscribed client base networks and infrastructure such as the computing infrastructure 102. The first hunter 105a may be an ethical hacker or a non-ethical hacker. Further, the first hunter 105a determines a potential remediation to the detected vulnerability.

At step 304, the first hunter 105a publishes the detected vulnerability and the potential remediation onto the Uncloak platform 103. At step 306, a check is performed to determine whether the detected vulnerability already exists in the database 104 or not. The Uncloak platform 103 may perform the check by searching the database for a presence or absence of the detected vulnerability. If at step 306, it is determined that the detected vulnerability does not exist in the database 104, then step 308 is processed. However, if at step 306, it is determined that the detected vulnerability exists in the database 104, then step 318 is processed.

At step 308, a pool of validators (such as the second hunter 105b, the third hunter 105c, and the fourth hunter 105d) are chosen to check the detected vulnerability. In an exemplary embodiment, a pool of at least 4 validators (such as at least the second hunter 105b, the third hunter 105c, the fourth hunter 105d, and a fifth hunter (not shown)) may be automatically chosen by the Uncloak platform 103 to validate the detected vulnerability. Each of the at least 4 validators may validate the detected vulnerability either independently or in conjunction with each other.

At step 310, if the detected vulnerability is found or determined to be valid, then the detected vulnerability is added to the database 104 along with the potential remediation to the detected vulnerability. In an exemplary embodiment, the detected vulnerability may be found or determined to be valid when at least a majority of the validators find or determine the detected vulnerability to be valid. In another exemplary embodiment, the detected vulnerability may be found or determined to be valid when all of the validators find or determine the detected vulnerability to be valid.

At step 312, the new vulnerability (i.e., the vulnerability detected by the first hunter 105a and successfully validated by at least the majority of the validators) is reported to all affected clients (such as the customer 101) to allow them to take the necessary remediation steps. In some embodiments, the Uncloak platform 103 may also report the potential remediation for the detected vulnerability to all affected clients (such as the customer 101).

At step 314, an issue (i.e., the hacker such as the first hunter 105a) who has detected the vulnerability and the validators (such as the second hunter 105b, the third hunter 105c, the fourth hunter 105d, and the fifth hunter (not shown)) are rewarded with one or more tokens such as UCC tokens. In an exemplary embodiment, the issue may be given 10,000 UCC tokens and the validators may be given 1,000 UCC tokens each. The one or more tokens may be converted on the Uncloak platform 103 to tradeable UNC tokens which can be exchanged for other digital currency such as Ethereum on a public exchange. In an exemplary embodiment, the UCC tokens awarded to the first hunter 105a may be greater than the UCC tokens that are awarded to the validators.

At step 316, all transactions are recorded in the blockchain. The blockchain is a data structure that stores the transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

At step 318, the first hunter 105a is notified and no payment is made but a star is awarded for an attempt. In an embodiment, the Uncloak platform 103 may be configured to generate a notification message indicating the unsuccessful validation of the vulnerability detected by the first hunter 105a, and communicate the same to the first hunter 105a when it is determined that the detected vulnerability already exists in the database 104. At step 220, the process stops.

The various actions, acts, blocks, steps, or the like in the flow diagram 300 may be performed in the order presented, in a different order, or simultaneously. Further, in some embodiments, some of the actions, acts, blocks, steps, or the like may be omitted, added, modified, skipped, or the like without departing from the scope of the present invention.

Thus, in accordance with the above described processes, instead of a costly and timely manual screening or due-diligence process to decide whether a vulnerability should be placed on the Uncloak platform 103, the solution presented herein uses an automated approach to cyber threat management. If a new vulnerability has been raised by a hunter, a number of the following procedures will occur (as described above) before a new cyber threat is registered, implemented and recorded using Smart Contract invocations. This process is transparent and can be audited by anyone using a blockchain explorer on the Uncloak platform 103.

FIG. 4 is a diagram that illustrates a representative block diagram of the Uncloak platform 103, according to an exemplary embodiment of the present invention. The Uncloak platform 103 includes a registration module 402, a wallet module 404, a notification module 406, a validation module 408, and a storage module 410.

In an embodiment, the registration module 402 may include suitable logic, circuitry, interfaces, and/or code, executable by the circuitry, that may be configured to perform one or more operations related to application and registration of the one or more hackers (such as the first hunter 105a, the second hunter 105b, the third hunter 105c, and the fourth hunter 105d) who have applied for access to a security platform such as the Uncloak platform 103.

In an embodiment, the wallet module 404 may include suitable logic, circuitry, interfaces, and/or code, executable by the circuitry, that may be configured to perform one or more operations related to generation of one or more private wallet, and further assign the generated private wallet details to one or more successful applicants who have been selected for participation in the vulnerability hunts and validations.

In an embodiment, the notification module 406 may include suitable logic, circuitry, interfaces, and/or code, executable by the circuitry, that may be configured to perform one or more operations related to generation of one or more notification messages and communication of the one or more notification messages to the one or more successful or unsuccessful applicants.

In an embodiment, the validation module 408 may include suitable logic, circuitry, interfaces, and/or code, executable by the circuitry, that may be configured to perform one or more operations related to validation of the one or more applicants (such as the first hunter 105a, the second hunter 105b, the third hunter 105c, and the fourth hunter 105d) who have applied for access to a security platform such as the Uncloak platform 103. Further, the validation module 408 may be configured to perform one or more operations related to validation of the one or more vulnerabilities detected by the one or more hunters.

The storage module 410 is configured to store data related to the one or more hunters and validators. In an embodiment, the storage module 410 is a multi-tier storage system. In another embodiment, the storage module 410 stores the information in an encrypted format. In yet another embodiment, the storage module 410 stores the information in an indexed format. The storage module 410 facilitates storage, retrieval, modification, and deletion of data in conjunction with various data-processing operations. Storage module information may be retrieved through queries using keywords and sorting commands, in order to rapidly search, rearrange, group, and select the field.

In one embodiment, the storage module 410 is secure web servers and Hypertext Transport Protocol Secure (HTTPS) capable of supporting Transport Layer Security (TLS. Communications to and from the secure web servers may be secured using Secure Sockets Layer (SSL). An SSL session may be started by sending a request to the Web server with an HTTPS prefix in the URL. Alternatively, any known communication protocols that enable devices within a computer network to exchange information may be used. Examples of protocols are as follows: IP (Internet Protocol), UDP (User Datagram Protocol), TCP (Transmission Control Protocol), DHCP (Dynamic Host Configuration Protocol), HTTP (Hypertext Transfer Protocol), FTP (File Transfer Protocol), Telnet (Telnet Remote Protocol), SSH (Secure Shell Remote Protocol), POP3 (Post Office Protocol 3), SMTP (Simple Mail Transfer Protocol), IMAP (Internet Message Access Protocol), SOAP (Simple Object 102 Access Protocol), PPP (Point-to-Point Protocol), RFB (Remote Frame buffer) Protocol.

FIG. 5 is a diagram that illustrates a system architecture of a computer system 500 for detecting and validating cyber threats by using various features facilitated by the Uncloak platform in an online manner, according to an exemplary embodiment of the present invention. An embodiment of the disclosure, or portions thereof, may be implemented as computer readable code on the computer system 500. In one example, various components (such as the Uncloak platform 103 or the database 104) of FIG. 1 and/or FIG. 4 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 2 and 3.

The computer system 500 may include a processor 502 that may be a special purpose or a general-purpose processing device. The processor 502 may be a single processor, multiple processors, or combinations thereof. The processor 502 may have one or more processor "cores." Further, the processor 502 may be coupled to a communication infrastructure 504, such as a bus, a bridge, a message queue, the communication network, multi-core message-passing scheme, and the like. The computer system 500 may further include a main memory 506 and a secondary memory 508. Examples of the main memory 506 may include RAM, ROM, and the like. The secondary memory 508 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage unit may be a non-transitory computer readable recording media.

The computer system 500 may further include an I/O port 510 and a communication interface 512. The I/O port 510 may include various input and output devices that are configured to communicate with the processor 502. Examples of the input devices may include a keyboard, a mouse, a joystick, a touchscreen, a microphone, and the like. Examples of the output devices may include a display screen, a speaker, headphones, and the like. The communication interface 512 may be configured to allow data to be transferred between the computer system 500 and various devices that are communicatively coupled to the computer system 500. Examples of the communication interface 512 may include a modem, a network interface, i.e., an Ethernet card, a communications port, and the like. Data transferred via the communication interface 512 may be signals, such as electronic, electromagnetic, optical, or other signals as will be apparent to a person of ordinary skill in the art. The signals may travel via a communications channel, such as the communication network, which may be configured to transmit the signals to the various devices that are communicatively coupled to the computer system 500. Examples of the communication channel may include a wired, wireless, and/or optical medium such as cable, fiber optics, a phone line, a cellular phone link, a radio frequency link, and the like. The main memory 506 and the secondary memory 508 may refer to non-transitory computer readable mediums that may provide data that enables the computer system 500 to implement the methods illustrated in FIGS. 2 and 3.

Various embodiments of the disclosure provide a non-transitory computer readable medium having stored thereon, computer executable instructions, which when executed by a computer, cause the computer to execute operations for detecting and validating cyber threats. Further, various embodiments of the disclosure provide a non-transitory computer readable medium having stored thereon, computer executable instructions, which when executed by a computer, cause the computer to execute operations for providing a unique and fully scalable blockchain powered technology that enables businesses to monitor, protect themselves against and eliminate cyber threats, staying one step ahead of the hacker. Further, various embodiments of the disclosure provide a non-transitory computer readable medium having stored thereon, computer executable instructions, which when executed by a computer, cause the computer to execute operations for providing an Artificial Intelligence (AI) based analytical tool for the intuitive, automated and seamless performance of security checks, thereby giving users an ability to cut through the cyber jargon and understand, remediate, and resolve cyber security issues. Further, various embodiments of the disclosure provide a non-transitory computer readable medium having stored thereon, computer executable instructions, which when executed by a computer, cause the computer to execute operations for creating a decentralized, scalable, blockchain powered cyber security management solution that places an emphasis upon the strength of the wider community to contribute to finding vulnerabilities through a blockchain based mechanism.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the disclosure provide, among other features, systems and methods for detecting and validating cyber threats. While various exemplary embodiments of the disclosed systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth or scope.

While various embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

Although particular embodiments of the invention have been described in detail for purposes of illustration, various modifications and enhancements may be made without departing from the spirit and scope of the invention. The scope of the invention is accordingly defined by the following claims.

I claim:

1. A cybersecurity threat management method for detecting and managing cybersecurity vulnerabilities, comprising:
   generating and presenting, by an Uncloak platform via a network, a registration interface on a computing device associated with each hunter, wherein each hunter utilizes the registration interface to resister and apply access to the Uncloak platform;
   analysing and processing, by the Uncloak platform, the received access application from each hunter to validate, and generating a validation response that indicates successful or unsuccessful validation,
   detecting, by a first hunter of a community of hunters, a cyber vulnerability associated with a listed software, hardware, or network of computers, wherein all hunters in the community of hunters are allowed to access the Uncloak platform based on the successful validation;
   publishing, by the first hunter, the detected cyber vulnerability onto an Uncloak platform;
   performing, by the Uncloak platform, a check to determine whether the detected cyber vulnerability exists in a database or the detected cyber vulnerability does not exist in the database;
   selecting, by the Uncloak platform, a plurality of validators from the community of hunters to validate the detected cyber vulnerability, when the detected cyber vulnerability does not exist in the database, wherein the plurality of validators does not include the first hunter;
   validating, by the plurality of validators, the detected cyber vulnerability to determine if the detected cyber vulnerability is valid or invalid;
   adding, by the Uncloak platform, the detected cyber vulnerability as a new cyber vulnerability in the database, when the detected cyber vulnerability is determined as valid; and
   rewarding, by the Uncloak platform, a first quantity of tokens to the first hunter for detecting the new cyber vulnerability and a second Quantity of tokens to each of the plurality of validators for determining the new cyber vulnerability as valid, wherein transactions related to rewarding of tokens are recorded in a blockchain.

2. The method of claim 1, wherein the first hunter further publishes a potential remediation to the detected cyber vulnerability, along with the detected cyber vulnerability onto the Uncloak platform.

3. The method of claim 1, wherein the plurality of validators includes at least four validators, and wherein the detected cyber vulnerability is determined to be valid when at least a majority of the plurality of validators determine the detected cyber vulnerability to be valid.

4. The method of claim 1, further comprising reporting, by the Uncloak platform, the new cyber vulnerability along with a potential remediation to one or more affected clients, wherein the new cyber vulnerability along with the potential remediation allow them to take necessary remediation steps.

5. The method of claim 1, further comprising allowing, by the Uncloak platform, the first hunter and the plurality of validators to convert the awarded tokens into tradeable tokens which can be exchanged for other digital currency.

6. The method of claim 5, wherein the first quantity of tokens is greater than the second quantity of tokens.

7. The method of claim 1, further comprising notifying, by the Uncloak platform, to the first hunter of an unsuccessful validation of the detected cyber vulnerability, when the detected cyber vulnerability exists in the database or when the plurality of validators determines the detected cyber vulnerability as invalid.

8. The method of claim 1, where each hunter of the community of hunters is an ethical hacker or a non-ethical hacker, who is a security expert or a software developer and who is registered on the Uncloak platform.

9. The method of claim 1, wherein one or more hunters of the community of hunters are allowed to perform cybersecurity threat hunting onto the Uncloak platform after successful registration, wherein the successful registration is performed by the Uncloak platform by successfully executing and validating at least an application of each hunter.

10. The method of claim 9, wherein each hunter of the community of hunters is provided with a payment wallet onto the Uncloak platform for future payment of tokens, wherein the Uncloak platform generates the payment wallet and assign the generated payment wallet to each hunter in the community of hunters.

11. The method of claim 1, wherein the Uncloak platform is realized and implemented using blockchain and Artificial Intelligence (AI) based technologies.

12. The method of claim 1, wherein the database is configured to use Artificial Intelligence (AI) technology to crawl public and private Internet looking for latest cyber security threats, which are converted into security signatures and added to check if one or more vulnerabilities exist across subscribed client base networks and infrastructures.

13. A cybersecurity threat management system for detecting and managing cybersecurity vulnerabilities, comprising: an Uncloak platform for facilitating one or more operations comprising:
   generating and presenting, via a network, a virtual Machine on a cloud located computing device associated with each hunter, wherein each hunter utilizes the Virtual machine to register and apply access to the Uncloak platform;
   analysing and processing the received program application from each hunter with which to test and remediated in a virtual environment the application that may or may not have the vulnerability, and generating a validation response that indicates successful or unsuccessful validation;
   detecting, by a first hunter of a community of hunters, a cyber vulnerability associated with a listed software, hardware, or network of computers, wherein all hunters in the community of hunters are allowed to access the Uncloak platform based on the successful validation;
   publishing, by the first hunter, the detected cyber vulnerability onto the Uncloak platform;

performing a check to determine whether the detected cyber vulnerability exists in a database or the detected cyber vulnerability does not exist in the database;

selecting a plurality of validators from the community of hunters to validate the detected cyber vulnerability, when the detected cyber vulnerability does not exist in the database, wherein the plurality of validators does not include the first hunter;

validating, by the plurality of validators, the detected cyber vulnerability to determine if the detected cyber vulnerability is valid or invalid;

adding the detected cyber vulnerability as a new cyber vulnerability in the database, when the detected cyber vulnerability is determined as valid; and rewarding a first Quantity of tokens to the first hunter for detecting the new cyber vulnerability and a second Quantity of tokens to each of the plurality of validators for determining the new cyber vulnerability as valid, wherein transactions related to rewarding of tokens are recorded in a blockchain.

14. The system of claim 13, wherein the plurality of validators includes at least four validators, and wherein the detected cyber vulnerability is determined to be valid when at least a majority of the plurality of validators determine the detected cyber vulnerability to be valid.

15. The system of claim 13, wherein the Uncloak platform is further configured to allow the first hunter and the plurality of validators to convert the awarded tokens into tradeable tokens which can be exchanged for other digital currency.

16. The system of claim 15, wherein the first quantity of tokens is greater than the second quantity of tokens.

17. The system of claim 13, wherein one or more hunters of the community of hunters are allowed to perform cyber-security threat hunting onto the Uncloak platform after successful registration, wherein the successful registration is performed by the Uncloak platform by successfully executing and validating at least an application of each hunter.

18. The system of claim 17, wherein each hunter of the community of hunters is provided with a payment wallet onto the Uncloak platform for future payment of tokens, wherein the Uncloak platform is configured to generate the payment wallet and assign the generated payment wallet to each hunter in the community of hunters.

* * * * *